United States Patent [19]

Sand et al.

[11] 4,081,514

[45] Mar. 28, 1978

[54] PROCESS FOR PRODUCING FLUIDIZED MORDENITE PARTICLES

[75] Inventors: Leonard B. Sand, Holden; Glenn W. Dodwell, Worchester, both of Mass.

[73] Assignee: Zeochem Corporation, Worcester, Mass.

[21] Appl. No.: 656,782

[22] Filed: Feb. 10, 1976

[51] Int. Cl.$^2$ ............................................. C01B 33/28
[52] U.S. Cl. .................................... 423/328; 423/118; 252/455 Z
[58] Field of Search ............... 423/328, 329, 330, 118; 252/455 Z

[56] References Cited

U.S. PATENT DOCUMENTS

| | | | |
|---|---|---|---|
| 3,386,802 | 6/1968 | Michalko | 423/328 |
| 3,436,174 | 4/1969 | Sand | 423/329 |
| 3,615,188 | 10/1971 | Kouwenhoven et al. | 423/329 |
| 3,701,629 | 10/1972 | Maness | 423/329 |
| 3,777,006 | 12/1973 | Rundell et al. | 423/118 |
| 3,849,463 | 11/1974 | Dwyer et al. | 423/328 X |

FOREIGN PATENT DOCUMENTS 1,218,883  1/1971  United Kingdom ................. 423/329

OTHER PUBLICATIONS

Zhdanov, "Molecular Sieve Zeolites-I" ACS, 1971, pp. 36, 37.

Primary Examiner—Edward J. Meros
Attorney, Agent, or Firm—Norman S. Blodgett; Gerry A. Blodgett

[57] ABSTRACT

Process for forming a zeolite particle in the fluidizable size range from 20 to 150 micrometers. Acid-stable, molecular sieve zeolite mordenite is formed by mixing silica-alumina gel particles in the fluidized size range with sodium silicate, sodium hydroxide, sodium chloride, and mordenite seed crystals. For example, the mixture is reacted under autogenous pressure at 180° C for 24 hours.

10 Claims, No Drawings

PROCESS FOR PRODUCING FLUIDIZED MORDENITE PARTICLES

BACKGROUND OF THE INVENTION

Molecular sieve zeolites are crystalline materials which are capable of adsorbing large quantities of molecules which are of sufficiently small size to pass into the uniformly-sized openings of the zeolite crystal structure. The zeolites are widely used as adsorbents for separating small molecules from large molecules, and as size-selective catalysts and catalyst supports. One purpose for which the zeolites show promise is the removal of sulfur dioxide from acidic gas streams, such as the effluent from smelters, acid-producing facilities, and fossil-fuel burning, steam-generation units. To qualify for this use, a zeolite must be acid stable and available in a particulate form which is adapted for economic gas contacting. Zeolites which are acid stable include mordenite and ferrierite. In the past, acid stable particles of zeolite have been generally restricted to pellets in the ⅛ inch diameter size range and have been subject to attrition-resistance weaknesses which limit them to use in fixed-bed adsorption systems. These pellets are formed of zeolite crystals which are normally in the five micrometer size range.

The use of a fluidized bed system for contacting solid adsorbents with gas streams has many well-known advantages over fixed bed systems. In a fluidized system, a mass of fluidizable particles (particles in the size range of 20 to 200 micrometers) is suspended in an upwardly-moving stream of the gas to be contacted. The result is extremely effective contact adsorption and good heat transfer throughout the mass of particles, due to the vigorous agitation of the "boiling" system. Fluidized beds for use in acidic gas streams must satisfy three basic requirements. First, the particle must be of the proper size to allow them to be fluidizable. Second, the particles must be attrition-resistant, since the vigorous agitation of the particles provide substantial shock and abrasive contact between particles. Third, the particle itself must be acid stable in order to avoid physical destruction in the acidic stream of gas.

A fourth requirement results from the fact that adsorption operations often require ion-exchange of the zeolite. If the particle is not resistant to attack by the ion-exchange solutions, the ion-exchange must be carried out before the particle is formed.

Previous attempts to provide a zeolite particle which satisfies the above requirements have usually involved forming suitably-sized particles from smaller crystals of zeolite which have been aggregated with clay binders. In addition to having low attrition-resistance, the binders were not resistant to acid and other chemical attack, so that the particles often broke down in use. Attempts at forming fluidizable particles of pure zeolite have generally been restricted to the less acid stable zeolite varieties. Thus, either the particles or the zeolite crystal itself will not withstand the environment of many potential uses. These and other difficulties experienced with the prior art devices have been obviated in a novel manner by the present invention.

It is, therefore, an outstanding object of the invention to provide a zeolite particle in the fluidizable size range, which particle is both attrition-resistant and resistant to acid and other chemical attack.

Another object of this invention is the provision of a zeolite particle having both high adsorption capacity and high adsorption rates.

It is another object of the present invention to provide a zeolite particle which has practical value as an adsorbent, catalyst support, and ion-exchange medium.

A further object of the present invention is the provision of a zeolite particle which is manufactured in a simple and economic system.

With the foregoing and other objects in view, as will appear as the description proceeds, the invention resides in the combination and arrangement of process steps and the details of the composition hereinafter described and claimed, it being understood that changes in the precise embodiment of the invention herein disclosed may be made without the scope of what is claimed without departing from the spirit of the invention.

SUMMARY OF THE INVENTION

This invention involves a process for producing an acid-stable zeolite particle of fluidizable size. More specifically, the particles are single or intergrown crystals of mordenite having an average diameter in the range of approximately 35–150 micrometers. The process involves autoclaving a mixture having a molar batch composition which produces mordenite as a single crystalline phase and to which a mineralizing agent, such as sodium chloride and a small quantity of crystalline mordenite seeds have been added. For example, the reaction is carried out for approximately 24 hours at approximately 200° C.

DESCRIPTION OF THE PREFERRED EMBODIMENT

It has now been discovered that certain starting compositions in the soda-alumina-silica-water system can be made to crystallize into acid-stable zeolite crystals of uniform size within the fluidizable size range. The crystals exhibit high adsorption capacity and speed, and high attrition-resistance. The following examples are intended to demonstrate the nature of the process of this invention.

EXAMPLE 1 (Run No. A-G)

In an electrically stirred open beaker, 13.432 gms of N-Sodium silicate solution (0.3 $Na_2O$-$SiO_2$-7.3 $H_2O$) and 8.4201 gms $H_2O$ and 1.0444 gms sodium hydroxide were stirred until the sodium hydroxide had dissolved. 10.00 gms of uncalcined cracking catalyst (amorphous gel of composition $Al_2O_3$-10.38 $SiO_2$-5.18 $H_2O$ and trace ammonia, size range 20-120 micrometers, and designation "Davison Gel SMR-5-1004 Low Alumina" manufactured by Davison Chemical Corporation) were sprinkled slowly into the mixture while stirring and then 4.3094 gms of sodium chloride were sprinkled in. Stirring was continued until the gel was homogeneously dispersed. The resulting mix has a molar composition of 2.6 $Na_2O$-$Al_2O_3$-6 NaCl.-15.6 $SiO_2$-80 $H_2O$. Simultaneously with the stirring, and in an adjacent area, a sample of hydrogen mordenite (H Zeolon) was being processed and airborne particles of the mordenite undoubtedly accidently moved into the beaker. The mixture was autoclaved at 176° for 20 hours, and then 180° for 4 hours, washed with 200 mls. of water, vacuum filtered, and dried at 50° C for several hours. X-ray diffraction analysis showed 100% mordenite. The particles appeared to be in the fluidized size range (flowing characteristics) and scanning election micrographs showed that the particles were single crystals having substantially uniform average size of 35-50 micrometers (about 75% of the crystals were in that range whereas nearly all of the remaining crystals were in the 20-35 micrometer range).

EXAMPLE 2 (Run No. R 1-6)

The procedure of Example 1, was repeated except that the autoclaving was carried out at 180° for 24 hours and care was taken to avoid any seeding. The resulting material was amorphous to X-rays. Scanning election micrographs revealed scattered nucleation. After 48 hours, there wa less than 5% X-ray detectable mordenite.

EXAMPLES 3-9 (Runs No. 20-26)

The procedure of Example 2 was followed exactly except that the following amounts of fine hydrogen mordenite (H-Zeolon) were added to the starting gel:

| Example | Mg. of Seed Material |
| --- | --- |
| 3 | 19 |
| 4 | 46 |
| 5 | 78 |
| 6 | 157 |
| 7 | 194 |
| 8 | 131 |
| 9 | 1329 |

In all cases, X-ray diffraction revealed 90-100% mordenite and optical microscope examination revealed that a substantial number of particles in each batch were within the fluidizable size range (20-120 micrometers), but the average size of each example was not as high as in Example 1 (approximately 20-25 micrometers diameter).

EXAMPLE 10 (Run 55)

The procedure of Examples 3-9 was repeated except that the autoclaving was carried out at 180° C for 24 hours and then 205° C for 12 hours. X-ray diffraction analysis revealed that the product was 100% mordenite and scanning election micrographs showed a predominance of uniformly cylinder-shaped crystals 30-35 micrometers wide and 33-40 micrometers long. Adsorption of benzene indicated that the material was large port. Adsorption of sulfur dioxide was carried out at 36 mm Hg of sulfur dioxide, resulting in 11 wt.% capacity with 80% of capacity reached in five seconds. The capacity was similar to that on commercially available mordenite.

EXAMPLE 11 (Run 27)

The procedure of Example 1 was followed except that the sodium chloride was not added. The resulting product was pure mordenite crystals of about four micrometers diameter (all dimensions). The crystals were aggregated into sturdy particles about 25% of which were in the size range 70-80 micrometers. The remainder were significantly smaller.

STARTING COMPOSITION

It is well known that mordenite can be crystallized from a composition in the soda-silica-alumina-water system which is on the anhydrous molar compositional join between the composition of mordenite ($Na_2O-Al_2O_3-10\ SiO_2-6.3\ H_2O$) and the composition of N-sodium silicate ($0.3\ Na_2O-SiO_2-7.3\ H_2O$). The normal process for synthesizing mordenite is temperature dependent as described in the patent to Sand U.S. Pat. No. 3,436,174 issued Apr. 1, 1969. A starting composition which crystallizes at 150° to 200° C in about 24 hours is the preferred embodiment of this invention. This molar composition is $2.6\ Na_2O-Al_2O_3-15.6\ SiO_2-80\ H_2O-6\ NaCl$.

The sodium chloride is present as a mineralizing agent to increase the viscosity of the starting material mix and appears to suspend the solid starting material particles in the liquid of the mixture. While 6 moles of sodium chloride are preferred, other sodium halides (NaBr, NaF), and other amounts up to about 10 moles have been found also effective. While the starting materials can be present in many forms, a critical concept is that the starting mix be a dispersion of silica-alumina particles in the fluidized size range in a medium of liquid sodium silicate. In the preferred embodiment, the silica-alumina particles are in the form of amorphous solid silica-alumina gel having a composition as described in Example 1, and available as a commercial cracking catalyst. Other silica-alumina gels of the preferred composition and size were also successfully used but the resulting crystals, though averaging 30 micrometers along the "$c$" axis, were generally smaller along the "$a$" and "$b$" axis (9 micrometers). These other gels included the commercial cracking catalyst after calcining at 100° C for four hours to remove the ammonia.

Last, the reaction mixture must contain seeds of the zeolite which is desired. The seeds are preferably in the 1-20 micrometer range. While mixtures in which seeding was not present, did not yield significant X-ray detectable zeolite within 48 hours, (crystallites substantially below one micrometer are not detectable using standard X-ray diffraction methods), the addition of a single five micrometer seed was enough to allow complete crystallization to zeolite within 24 hours. Increasing amounts of seed material decrease nucleation phase of the reaction. Furthermore, it was found to increase average crystal size if the starting mixture is allowed to digest at room temperature for one-half to two hours before seeding, and then the seeds are placed on the reaction mixture without further mixing (inhomogeneous seeding). Successful seeding was accomplished with hydrogen mordenite, and sodium mordenite, both large- and small-port varieties.

AUTOCLAVE

The reaction is carried out in a modified Morey-type 304 low-carbon stainless steel vessel of approximately 15 millimeters volume and having a silver liner and Teflon seal. The system is sealed to maintain autogenous pressure. The liner interior surface is machined-down between runs to avoid interrun nucleation. The volume of the vessel is filled to approximately 90% with the reaction mixture.

TIME

The time of reaction will depend to a great extent on the temperature at which the material is autoclaved, as mentioned above. In general, a time of about 18 hours to 48 hours can be used, but the preferred time is 22 to 36 hours. For convenience of discussion, the progress of crystallization during the reaction time may be divided into three phases. Phase I or the nucleation phase begins at the moment that the starting materials are mixed together, and proceeds through the placing of the reaction vessel into an oven for heating to the reaction temperature and until the nucleated crystals reach a size at which they are detectable by X-ray diffraction. The length of time of Phase I will depend on the temperature and viscosity of the system, the homogeneity of the reaction mixture and the amount of seed crystals present. Since the number of crystals which develop far exceeds the number of seed crystals placed in the system, it is clear that the roll of the seed crystals is not merely as growth centers, but is rather as contributors of intermediate crystalline structures.

Phase II or the growth phase involves a more or less uniform growth rate of detectable crystals (up to about 75 micrometers) at each of the nucleated sites. This phase of the cycle appears to continue until the starting material components are exhausted. Phase II is present in the preferred embodiment from about 18 until 24 hours in the cycle.

In Phase III or the consolidation phase, the larger of the crystals continue to grow at the expense of the smaller of the crystals. Each growing crystal will continue until it reaches a size which is quasi-thermodynamically favored for the system after which its growth will cease. The result is that the crystals grow to a favored size at the expense of smaller crystals, and at the end of Phase III, a decreased number of large, uniformly-sized crystals remain in the reaction vessel. The end of this phase will normally occur at about 36 hours in the growth cycle.

TEMPERATURE

The temperature at which this crystallization reaction proceeds is normally between 150° and 250° C. In the preferred embodiment, the reaction would be carried out between 176° and 205° C. Furthermore, in the preferred embodiment, it has been found desirable to raise the reaction temperature between 5° and 20° C between Phases II and III. This would normally occur at about two-thirds of the reaction time, and appears to promote circulation within the reaction mixture.

While it will be apparent that the illustrated embodiments of the invention herein disclosed are well calculated adequately to fulfill the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for the formation of acid-stable particles of the zeolite mordenite in the fluidizable size range from 20 to 150 micrometers, comprising the steps of:
    a. preparing a reaction mixture in which a mineralizing agent is provided and in which at least one component of the reaction mixture is provided in the form of a dispersion of ingredient particles of silica-alumina in the size range capable of fluidization in a medium of sodium silicate the mineralizing agent consisting of sodium halide and serving to increase the viscosity of the mixture,
    b. seeding the mixture with a small quantity of mordenite seed crystals,
    c. placing the seeded mixture in an autoclave, and
    d. reacting the mixture at a temperature in the range from 150° to 250° C until mordenite crystallizes in the form of particles in said fluidizable size range.

2. A process as recited in claim 1, wherein the reaction mixture has a molar batch composition of $2.6Na_2O$-$Al_2O_3$-$15.6SiO_2$-$80H_2O$-$6NaCl$.

3. A process as recited in claim 1, wherein the ingredient particles are silica-alumina gel.

4. A process as recited in claim 1, wherein the ingredient particles are of molar batch composition $Al_2O_3$-$10.38\ SiO_2$-$5.18\ H_2O$.

5. A process as recited in claim 1, wherein the mineralizing agent is sodium chloride.

6. A process as recited in claim 1, wherein the autoclave is filled to 90% of its volume with the mixture.

7. A process as recited in claim 1, wherein the reaction is carried out at autogenous pressure.

8. A process as recited in claim 1, wherein the temperature at which the reaction takes place is raised by an amount in the range from 5° to 20° C between a growth phase and a consolidation phase.

9. A process as recited in claim 1, wherein the temperature at which the reaction takes place is raised by an amount in the range from 5° to 20° C at about two-thirds of the total reaction time.

10. A process as recited in claim 1, wherein the reaction is carried out for 24 hours.

* * * * *